P. MAGNUS.
Water-Closet Valve.
No. 197,037. Patented Nov. 13, 1877.
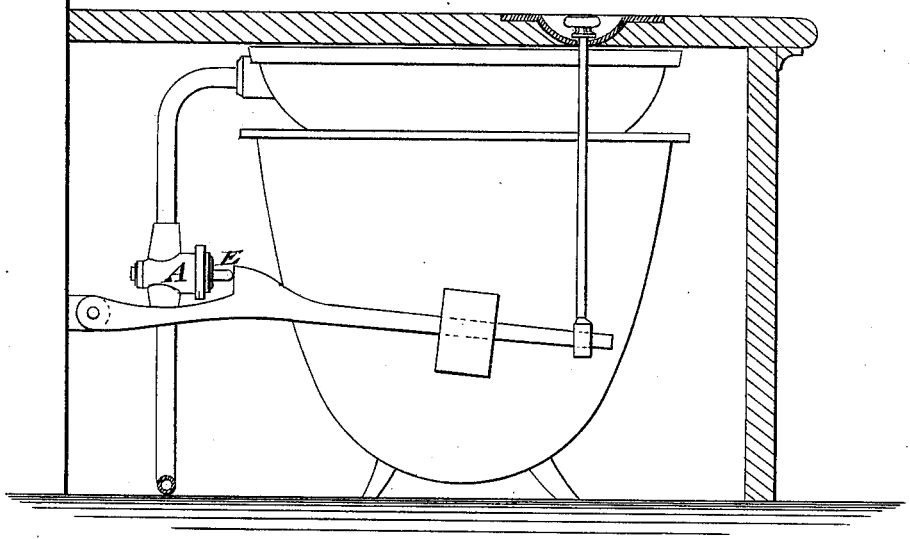
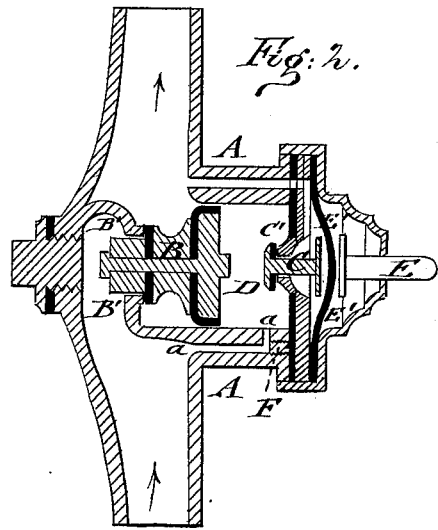 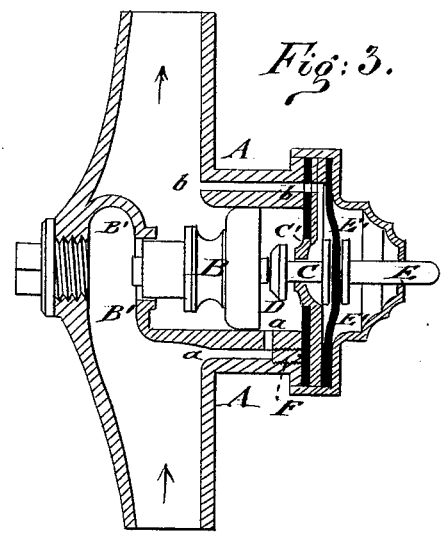
WITNESSES:
INVENTOR:
P. Magnus
BY
ATTORNEYS.

UNITED STATES PATENT OFFICE.

PAUL MAGNUS, OF NEW YORK, N. Y.

IMPROVEMENT IN WATER-CLOSET VALVES.

Specification forming part of Letters Patent No. 197,037, dated November 13, 1877; application filed October 6, 1877.

*To all whom it may concern:*

Be it known that I, PAUL MAGNUS, of the city, county, and State of New York, have invented a new and Improved Valve for Water-Closets, of which the following is a specification:

In the accompanying drawings, Figure 1 represents a side elevation of a water-closet with my improved valve, and Figs. 2 and 3 vertical central sections of the same, showing the valve respectively in closed and in open position.

Similar letters of reference indicate corresponding parts.

This invention relates to an improved self-acting supply-valve for water-closets and other purposes, that gives a perfect and easily-regulated supply of water, and has the great advantage of working without any spring or compression device, which in the old style of closet-valves is so liable to get out of order from constant use and contact with water.

The valve is very simple in construction, all parts being made of solid metal, with suitable packings of leather or rubber, and readily accessible for repairs.

The supply of water may be easily regulated, and worked even under the greatest pressure, without any hammering.

The invention consists of a valve operated by a center stem in the usual manner, and having two interior valves—a larger one to open or close the main supply-pipe, and a smaller one to supply or discharge, in connection with suitable channels, a water-chamber intermediately between the larger and smaller valve.

The center stem acts on the smaller valve that connects the intermediate water-chamber with an exit-channel, removing the pressure of the water from the larger valve, and admitting the opening of the same.

The closing of the small valve secures the filling of the water-chamber and the closing of the main valve by the pressure of the water.

A small screw-plug in the supply-channel of the water-chamber regulates the supply of water through the main supply-pipe by retarding or expediting the passage of water through supply-channel.

In the drawings, A represents the valve-casing, which is arranged at the inside with two valves, B and C, and valve-seats B' and C', the larger valve, B, serving to close the main pipe and supply to the closet, while the smaller valve, C, serves to. govern the supply or discharge of the water to a chamber, D, that is arranged at the interior of the valve-casing intermediately between the valves B and C.

The valves B and C are guided by channeled stems or pistons in their respective seats, and are operated, one automatically, by the pressure of the water, the other by a center stem or piston, E, that is operated by the usual lever and lever-rod arrangement in water-closets, as shown in Fig. 1.

The raising of the handle of the lever-rod produces the pushing in of the stem E, and thereby the opening of the valve C.

A rubber or leather packing or diaphragm, E', is interposed between stem E and valve C, to prevent any escape of water, the valves being also packed in suitable manner to secure their reliable working.

The main supply-pipe communicates below valve by a channel, $a$, with the water-chamber D, so as to let the water enter directly into the space between the two valves B and C.

An exit-channel, $b$, connects the space between valves C and diaphragm E with the main pipe above valve B, so as to allow the water which has accumulated in the chamber D to run out as soon as valve C is opened by stem E.

The water entering from the main supply-pipe will press against the bottom surface of the valve B, and at the same time will enter through the small channel $a$ and fill quickly the water-chamber D. There it will press on the top surface of valve B and on the bottom surface of valve C. The valve C will thereby be closed, and as the top surface of valve B is larger than the bottom surface, a greater pressure will be exerted on the top than on the bottom, and thereby the valve B also closed in reliable manner, as shown in Fig. 2.

As soon as pressure is exerted on the stem E, valve C will be opened, and the water in chamber D forced out through the exit-channel $b$.

The pressure on the stem E being relaxed, the water will commence again to fill space D, and as soon as said space is filled the two valves B and C will be closed, and the supply to the closet shut off.

An adjustable screw-plug, F, in the entrance-channel a, serves for the purpose of regulating the supply of water, as in case of very high pressure of the water the water-chamber D would fill too soon, and allow thus an insufficient quantity of water to enter the closet.

By turning the screw-plug F inward, the space in channel a is diminished, and thereby the water compelled to enter slower into chamber D, thus allowing a greater length of time for the water to pass through the main pipe to the closet, as it will take longer to bring the necessary pressure to bear on the valves B and C for closing them, and vice versa, expediting their working and furnishing a smaller water-supply to the closet by enlarging the supply-passage. The valve, being thus worked by the pressure of the water mainly, and by the motion of the center stem, is worked in very easy manner, as the slightest pressure on the center stem is sufficient to open the smaller valve, and thereby in automatic manner the large valve and the supply-pipe.

Having thus described my invention, I claim as new, and desire to secure by Letters Patent—

1. A valve for water-closets, consisting of two interior valves and an intermediate water-chamber, connected to the main supply-pipe by entrance and exit channels at opposite sides of the valves, one of the valves being opened by exterior means, the other by the pressure of the water, substantially as set forth.

2. The combination, in a valve for water-closets, of an actuating stem or piston, with an interior valve, a diaphragm or packing interposed between stem and valve, and an interior water-chamber having supply and discharge channels, to open valve by exterior pressure and close the same automatically by interior water-pressure, substantially as set forth.

3. The combination, in a valve for water-closets and other purposes, of an interior main valve that opens or closes the main supply-pipe, said valve having a larger top and a smaller bottom surface, of a smaller interior valve that is opened by exterior pressure and closed by interior water-pressure, and of an intermediate water-chamber between the valves that is connected by a supply-channel directly, and by a discharge-channel through the smaller valve with the main supply-pipe, to regulate, by the interior pressure of the water in the main pipe or water-chamber, the automatic opening or closing of the main valve, substantially as specified.

PAUL MAGNUS.

Witnesses:
PAUL GOEPEL,
ALEX. F. ROBERTS.